(12) United States Patent
Joly et al.

(10) Patent No.: US 11,111,811 B2
(45) Date of Patent: Sep. 7, 2021

(54) GAS TURBINE ENGINE WITH MORPHING VARIABLE COMPRESSOR VANES

(71) Applicant: United Technologies Corporation, Farmington, CT (US)

(72) Inventors: Michael M. Joly, Hebron, CT (US); Zaffir A. Chaudhry, South Glastonbury, CT (US); Simon W. Evans, Farmington, CT (US); Gorazd Medic, West Hartford, CT (US); Dilip Prasad, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 97 days.

(21) Appl. No.: 16/460,060

(22) Filed: Jul. 2, 2019

(65) Prior Publication Data
US 2021/0003030 A1    Jan. 7, 2021

(51) Int. Cl.
| | |
|---|---|
| *F01D 17/16* | (2006.01) |
| *F01D 9/04* | (2006.01) |
| *F01D 17/24* | (2006.01) |
| *F02C 9/22* | (2006.01) |

(52) U.S. Cl.
CPC ........... *F01D 17/162* (2013.01); *F01D 9/041* (2013.01); *F01D 17/24* (2013.01); *F02C 9/22* (2013.01); *F05D 2240/12* (2013.01); *F05D 2260/407* (2013.01)

(58) Field of Classification Search
CPC combination set(s) only.
See application file for complete search history.

(56) References Cited

U.S. PATENT DOCUMENTS

| | | | |
|---|---|---|---|
| 4,619,580 A | 10/1986 | Snyder | |
| 6,139,268 A | 10/2000 | Murawski et al. | |
| 8,011,882 B2 | 9/2011 | McMillan | |
| 8,506,257 B2 | 8/2013 | Bottome et al. | |
| 9,741,922 B2 | 8/2017 | Wilkie et al. | |
| 10,273,976 B2 | 4/2019 | Jemora et al. | |
| 10,352,173 B2 * | 7/2019 | Prince | B29C 35/02 |
| 10,690,147 B2 * | 6/2020 | Hiernaux | F02C 7/14 |
| 10,697,320 B2 * | 6/2020 | Fulayter | G10K 11/17873 |
| 2005/0100438 A1 * | 5/2005 | Trewin | F02C 7/1435 |
| | | | 415/116 |

(Continued)

FOREIGN PATENT DOCUMENTS

| | | |
|---|---|---|
| DE | 102007028939 A1 | 1/2009 |
| EP | 2267273 A2 | 12/2010 |
| EP | 3232008 A1 | 10/2017 |

OTHER PUBLICATIONS

U.S. Appl. No. 16/219,240, filed Dec. 13, 2018 entitled "Adaptive Morphing Engine Geometry".

(Continued)

*Primary Examiner* — Binh Q Tran
(74) *Attorney, Agent, or Firm* — Carlson, Gaskey & Olds, P.C.

(57) ABSTRACT

A stator vane for a gas turbine engine section includes a stator vane having an airfoil extending between a leading edge and a trailing edge. The airfoil has a suction side and a pressure side. There is at least one piezoelectric actuator for changing a shape of at least one of the leading edge and the trailing edge. A gas turbine engine is also disclosed.

17 Claims, 7 Drawing Sheets

(56) References Cited

U.S. PATENT DOCUMENTS

| | | | |
|---|---|---|---|
| 2010/0329851 A1 | 12/2010 | Nilsson | |
| 2010/0329878 A1* | 12/2010 | Bottome | F01D 5/148 |
| | | | 416/223 R |
| 2012/0045318 A1* | 2/2012 | LaMaster | F04D 29/563 |
| | | | 415/151 |
| 2013/0302168 A1 | 11/2013 | Kray et al. | |
| 2016/0138419 A1* | 5/2016 | Kray | F01D 5/282 |
| | | | 415/208.1 |
| 2017/0298758 A1 | 10/2017 | Mears | |
| 2018/0223867 A1* | 8/2018 | Jemora | F04D 27/0246 |

OTHER PUBLICATIONS

Thornburgh, R.P., Kreshock, A.R., Wilbur, M.L., Sekula, M.K., Shen, J. (2014). Continuous Trailing-Edge Flaps for Primary Flight Control of a Helicopter Main Rotor. NASA/NF1676L-17681. May 20, 2014. pp. 1-13.

Wilkie, W., High, J., Bockman, J. (2002). Reliability Testing of NASA Piezocomposite Actuators. 8th International Conference on New Actuators. Jan. 1, 2002. pp. 1-4.

Thornburgh, R.P., Kreshock, A.R., Wilbur, M.L. (2016). Experimental Measurement of a Blade Section With a Continuous Trailing-Edge Flap. Presented at AHS 72nd Annual Forum, May 17, 2016. pp. 1-9.

Nuffer, J., Schönecker, A., Brückner, B., Kohlrautz, D., Michelis, P., Adarraga, O., Wolf, D. (2007). Reliability Investigation of piezoelectric Macro Fibre Composite (MFC) Actuators. May 23, 2007. pp. 1-9.

European Search Report for EP Application No. 20183797.8 dated Nov. 10, 2020.

\* cited by examiner

GAS TURBINE ENGINE WITH MORPHING VARIABLE COMPRESSOR VANES

BACKGROUND

This application relates to a gas turbine engine, wherein static compressor vanes can have their shape morphed.

Gas turbine engines are known and typically include a fan delivering air into a compressor section and into a bypass duct as bypass air. The air is compressed in the compressor section and delivered into a combustor where it is mixed with fuel and ignited. Products of this combustion pass downstream over turbine rotors, driving them to rotate. The turbine rotors, in turn, drive the fan and compressor section.

It is known to have static vanes between rows of blades in the compressor section. The vanes help direct the air into a desired direction as they approach each row of compressor blades.

However, the desired direction may change during the operational cycle of the gas turbine engine. As such, it is known to provide variable vanes. Variable vanes are typically provided with an actuator which pivots the vanes such that their leading and trailing edges change an incident angle relative to the angle of the compressor blades during the operation cycle of the gas turbine engine.

In general, the vanes have changed the incident angle as a monolithic vane such that as the leading edge changes its orientation so does the trailing edge.

SUMMARY

In a featured embodiment, a stator vane for a gas turbine engine section includes a stator vane having an airfoil extending between a leading edge and a trailing edge. The airfoil has a suction side and a pressure side. There is at least one piezoelectric actuator for changing a shape of at least one of the leading edge and the trailing edge.

In another embodiment according to the previous embodiment, there is at least one piezoelectric actuator mounted on each of the suction and pressure sides. One of the piezoelectric actuators is controlled to contract and the other is controlled to expand to change the position of the leading edge relative to the trailing edge.

In another embodiment according to any of the previous embodiments, the piezoelectric actuators are mounted within pockets in the suction and pressure sides.

In another embodiment according to any of the previous embodiments, the piezoelectric actuators are operable to change a position of the leading edge about a virtual hinge axis while changing the position of the trailing edge to a lesser extent.

In another embodiment according to any of the previous embodiments, the piezoelectric actuators are operable to change a position of the trailing edge about a virtual hinge axis while changing the position of the leading edge to a lesser extent.

In another embodiment according to any of the previous embodiments, the airfoil is connected to inner and outer platforms.

In another embodiment according to any of the previous embodiments, there is an elastomeric material between the airfoil and the radially inner and outer platforms to accommodate movement of at least one of the leading and trailing edges.

In another embodiment according to any of the previous embodiments, the elastomer connection does not extend along an entire axial distance between the leading edge and the trailing edge.

In another embodiment according to any of the previous embodiments, a radially central piezoelectric actuator causes the change in the position of the leading edge relative to the trailing edge. At least one radially spaced piezoelectric actuator is positioned between radially inner and outer ends of the airfoil and oriented at an angle to the radially central piezoelectric actuator to cause bowing of at least one of the leading and trailing edges.

In another embodiment according to any of the previous embodiments, the at least one radially spaced piezoelectric actuator is orientated at a right angle relative to the radially central piezoelectric actuator.

In another embodiment according to any of the previous embodiments, the at least one radially spaced piezoelectric actuator includes a pair of radially spaced piezoelectric actuators between the one of radially and inner and outer ends of the airfoil and orientated at a right angle relative to each other, and at a 45 degree angle relative to the radially central piezoelectric actuator.

In another embodiment according to any of the previous embodiments, the at least one piezoelectric actuator includes at least two, and mounted within pockets in the suction and pressure sides.

In another embodiment according to any of the previous embodiments, the piezoelectric actuators are operable to change a position of the leading edge about a virtual hinge axis while changing the position of the trailing edge to a lesser extent.

In another embodiment according to any of the previous embodiments, the piezoelectric actuators are operable to change a position of the trailing edge about a virtual hinge axis while changing the position of the leading edge to a lesser extent.

In another embodiment according to any of the previous embodiments, the airfoil is connected to radially inner and outer platforms. There is an elastomeric material between the airfoil and the radially inner and outer platforms to accommodate movement of at least one of the leading and trailing edges.

In another embodiment according to any of the previous embodiments, the airfoil is connected to radially inner and outer platforms. A radially central piezoelectric actuator causes a change in a position of the at least one of the leading and trailing edges. At least one radially spaced piezoelectric actuator is positioned between one of radially inner and outer ends of the airfoil and oriented at an angle to the radially central piezoelectric actuator to cause bowing of at least one of the leading and trailing edges.

In another embodiment according to any of the previous embodiments, the at least one radially spaced piezoelectric actuator is orientated at a right angle relative to the radially central piezoelectric actuator.

In another embodiment according to any of the previous embodiments, the at least one radially spaced piezoelectric actuator includes a pair of radially spaced piezoelectric actuators between the one of radially and inner and outer ends of the airfoil and orientated at a right angle relative to each other, and at a 45 degree angle relative to the radially central piezoelectric actuator.

In another embodiment according to any of the previous embodiments, the airfoils are formed of a metal.

In another featured embodiment, a gas turbine engine includes at least one row of rotating blades. A plurality of stator vanes are upstream of the at least one row of blades. The plurality of stator vanes each are provided with airfoils extending between a leading edge and trailing edge. The airfoils have a suction side and a pressure side. There is at least one piezoelectric actuator for changing a shape of at least one of the leading edge and the trailing edge.

These and other features may be best understood from the following drawings and specification.

DETAILED DESCRIPTION

Figure 1:
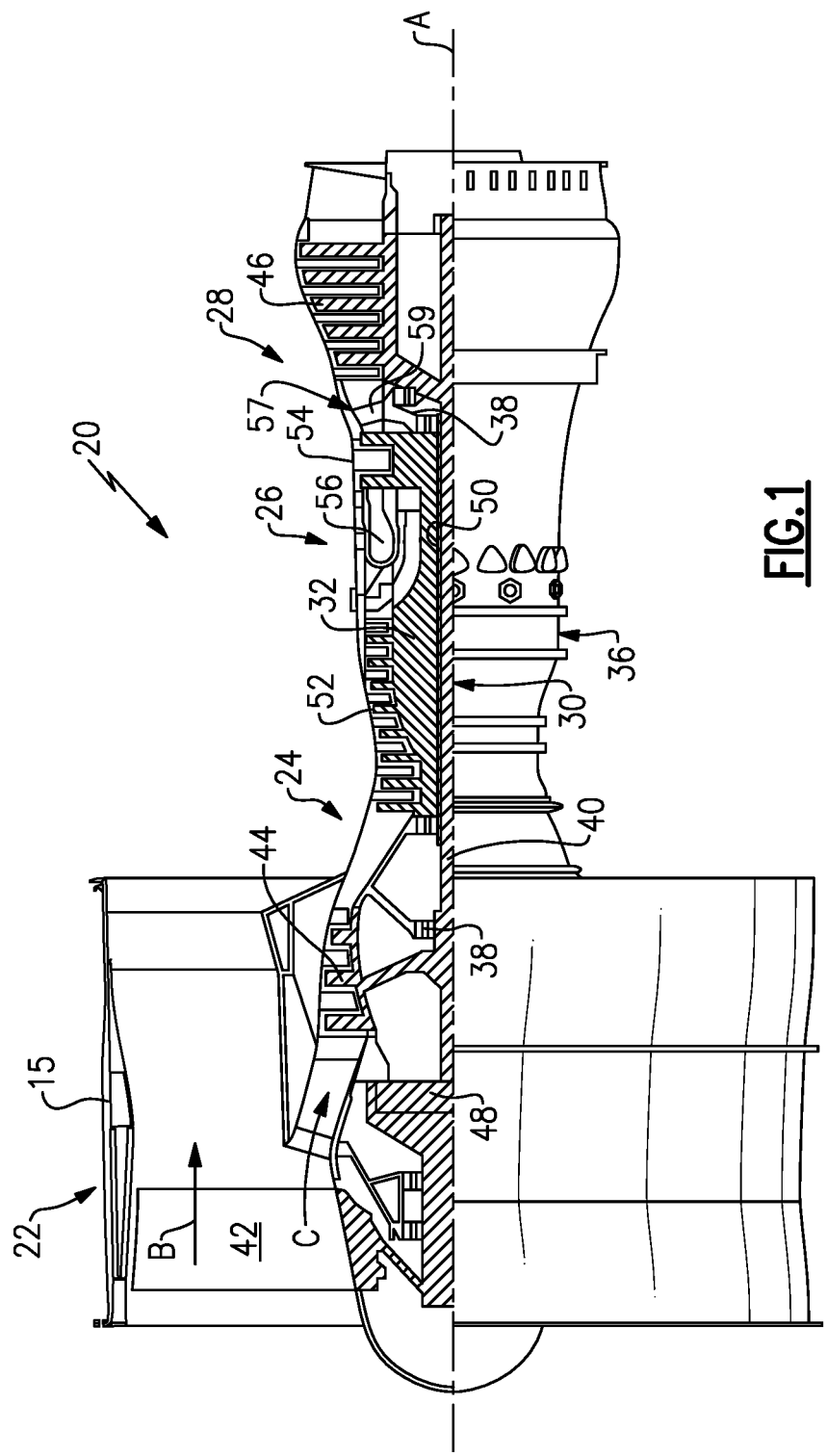
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second (350.5 meters/second).

Figure 2A:
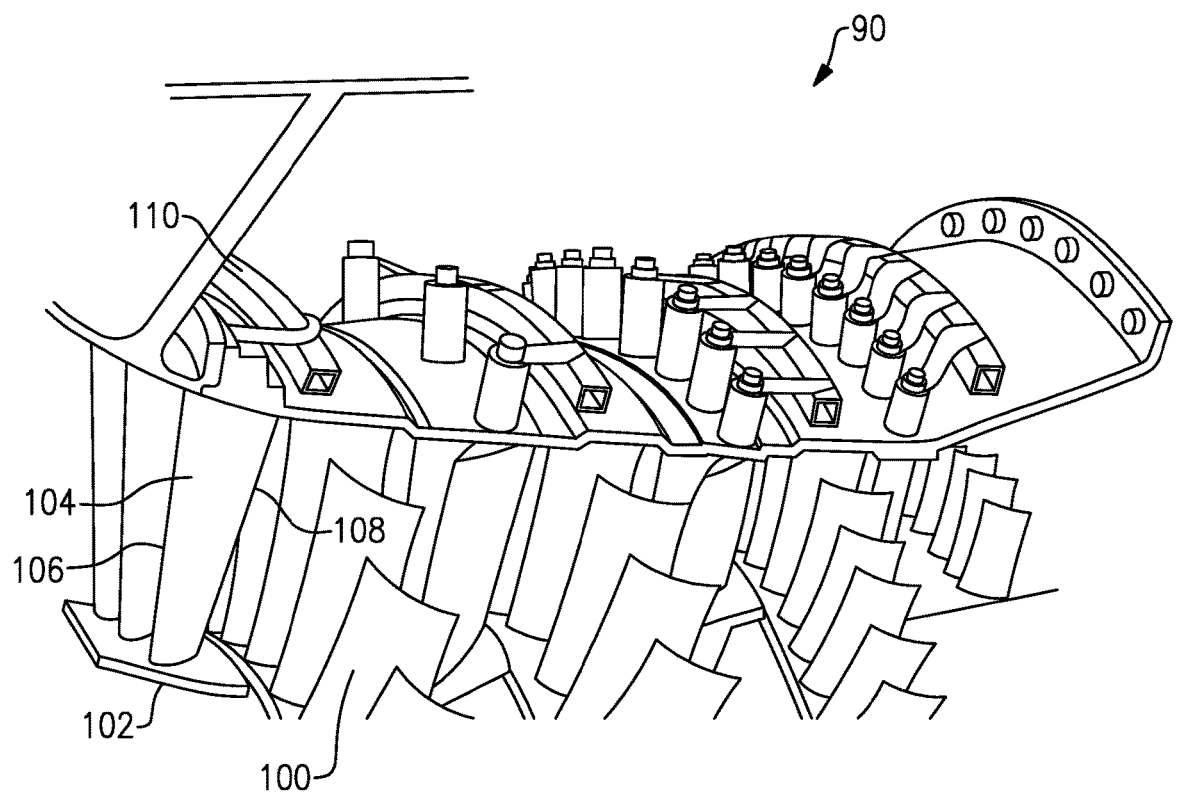
FIG. 2A shows a prior art compressor section.

FIG. 2 shows a compressor section 90 which may be incorporated into a gas turbine engine such as the gas turbine engine illustrated in FIG. 1, as an example.

Compressor blades 100 are aligned in rows, with intermediate rows of static vanes 102. The static vane 102 each include airfoils 104 extending from a leading edge 106 to a trailing edge 108. As mentioned above, it is desirable to change an incident angle of the airfoil 104 to direct the air toward the downstream row of blades 100 across the operational cycle of the gas turbine engine. As such, an actuator ring 110 is often utilized.

Figure 2B:
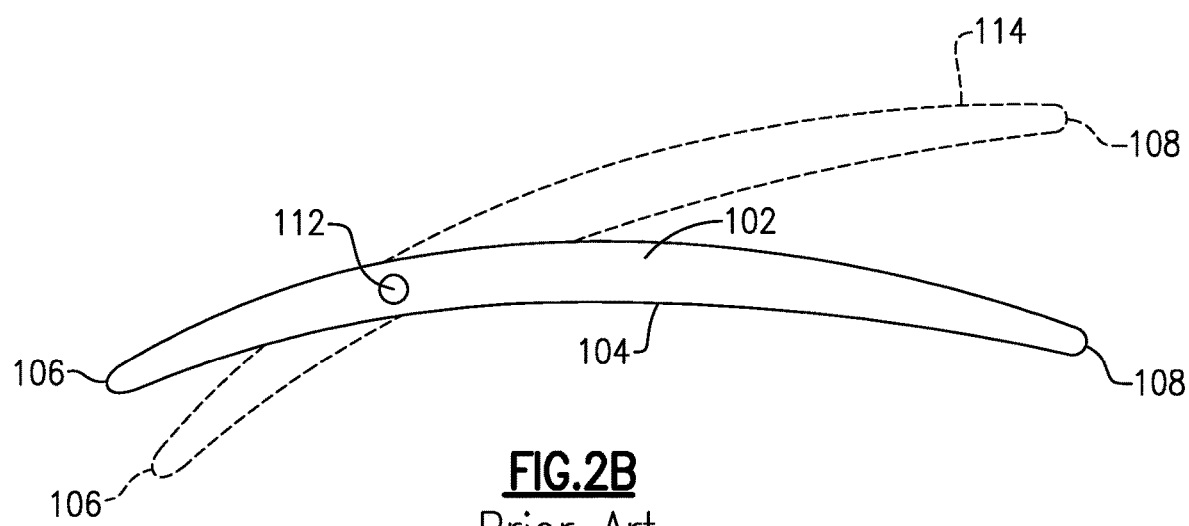
FIG. 2B shows a static vane in the prior art compressor section.

As shown schematically in FIG. 2B, actuator 110 can cause the vanes 102 to pivot about a pivot axis 112. As shown, the leading edge 106 and the trailing edge 108 can each pivot between the position illustrated in solid lines and a position 114 illustrated in phantom. The position is changed during the operational cycle. Determination of desired positions as appropriate given conditions is within the skill of a worker in this art.

As can be appreciated, with this type vane, as the leading edge position changes, the trailing edge position also changes, and in a fixed amount. That is, there is not independent control over a change in the position of the leading edge and the trailing edge.

Figure 3A:
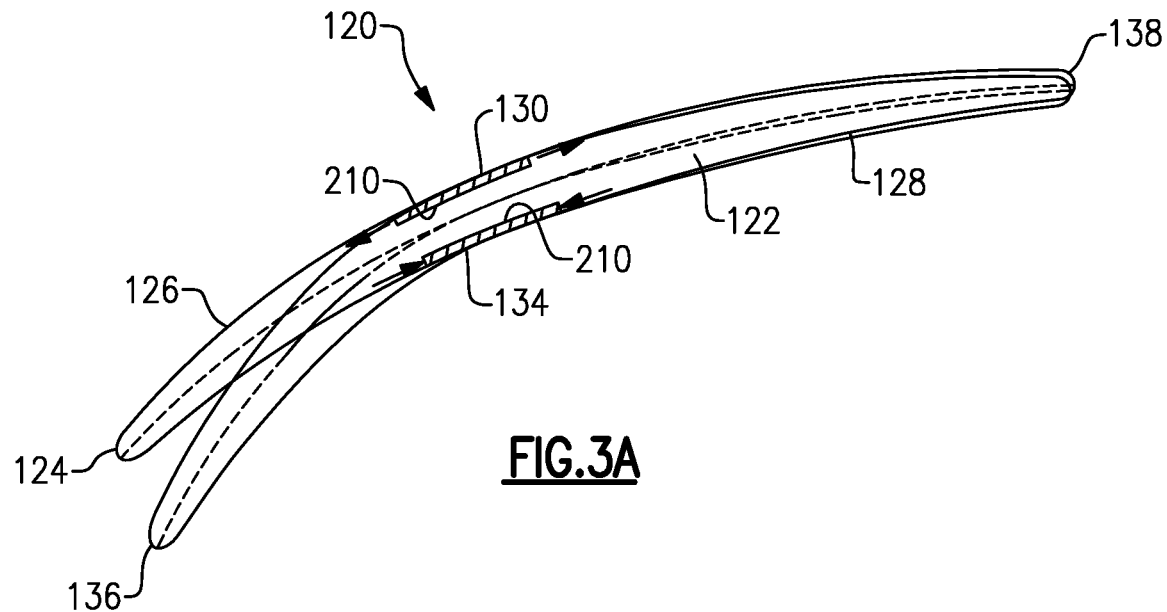
FIG. 3A shows a vane under this disclosure.

FIG. 3A shows a vane embodiment 120 having an airfoil 122 extending between a leading edge 124 and a trailing edge 138. There is a suction side 126 and a pressure side 128. There are also piezoelectric (PZT) actuators. Actuators 130 are on the suction side 126 and a second PZT actuator 134 is on the pressure side 128. As shown in this Figure, if the pressure side PZT 134 is caused to contract while the suction side PZT 130 is caused to expand, the leading edge 124 will move from the position illustrated to the position 136. At the same time, the trailing edge 138 remains relatively static.

PZT actuators are known which are sufficiently powerful to achieve this movement. PZT actuators 130/134 are mounted in pockets 210 in the airfoil body 122. It should be understood that the airfoil may be formed of an appropriate metal and desirably be thin enough such that the PZT actuators can achieve this movement.

With the FIG. 3A embodiment, the position of the leading edge 124/136 can be changed without a corresponding change in the position of the trailing edge 138. That is, the incident angle of the two edges can be changed independently.

The piezoelectric actuators are operable to change a position of the leading edge about a virtual hinge axis while changing the position of the trailing edge to a lesser extent.

Figure 3B:
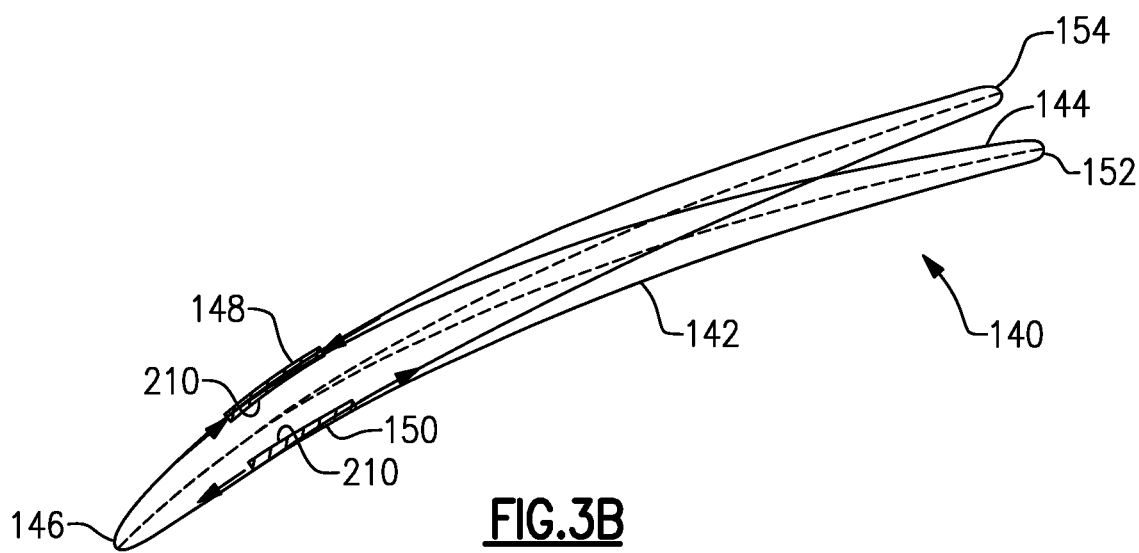
FIG. 3B shows a second embodiment vane.

FIG. 3B shows an embodiment wherein the airfoil 140 has its leading edge 146 remain relatively static and its trailing edge 152 change between positions 152 and 154. Here, the pressure side 142 receives a PZT actuator 150 and the suction side 144 receives a PZT actuator 148. Actuator 148 contracts and actuator 150 expands to cause the movement as illustrated.

The piezoelectric actuators are operable to change a position of the trailing edge about a virtual hinge axis while changing the position of the leading edge to a lesser extent.

It is also within the scope of this disclosure that both movements could be achieved within a single vane. It is within the scope of this disclosure that the movements illustrated in FIGS. 3A and 3B could be opposite those shown. That is, by contracting 130 and expanding 134, the leading edge could move up, reducing the camber of the airfoil 126. Similarly, if 148 expands and 150 contracts, airfoil 152 would have camber increased.

Figure 4A:
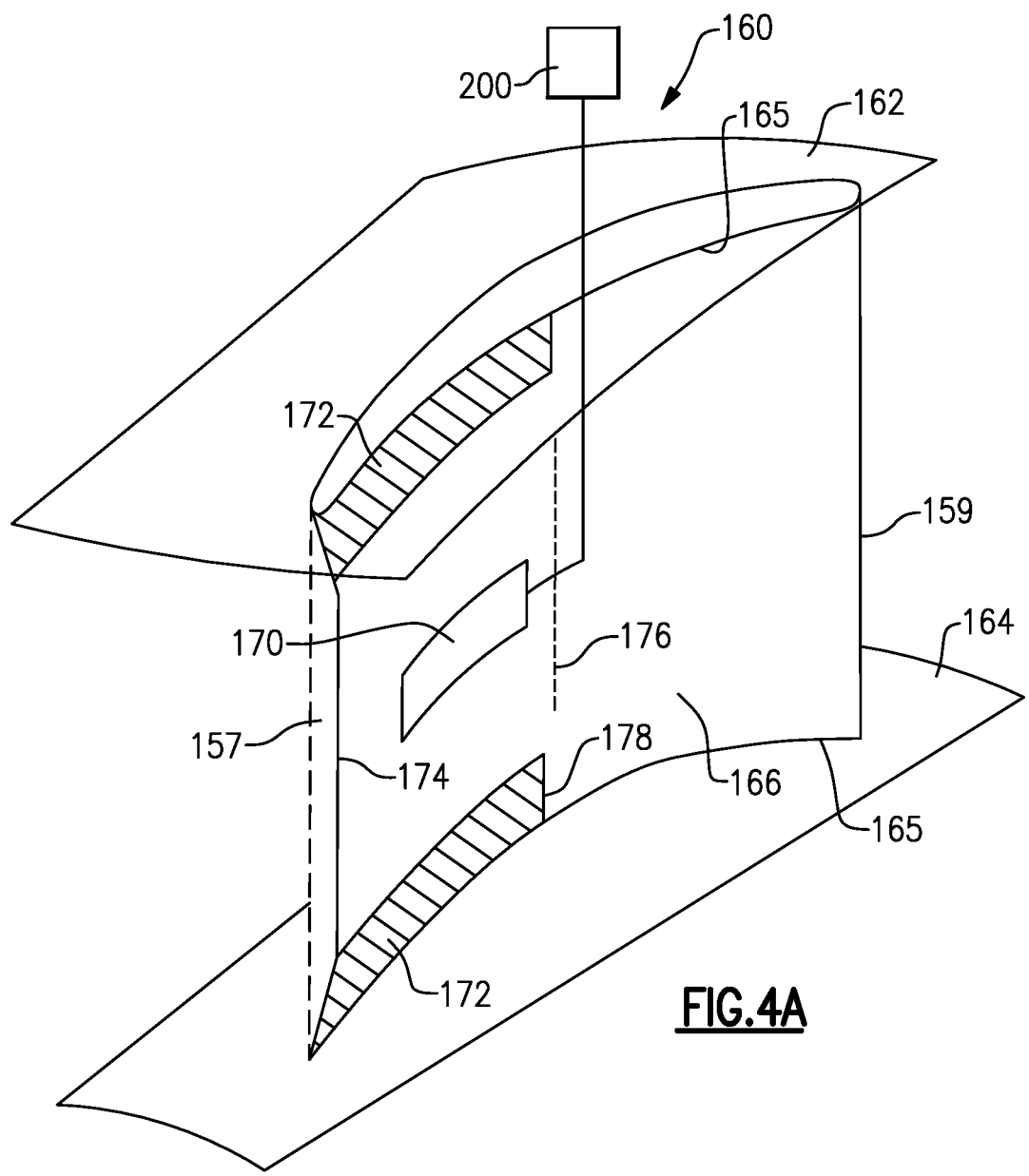
FIG. 4A shows an embodiment which may be utilized with either the FIG. 3A or FIG. 3B embodiment.

FIG. 4A shows a feature which is generally non-achievable with standard variable vanes. As can be appreciated, with modern gas turbine engines, efficiency becomes an overriding criteria. Thus, it is desirable to not allow leakage across a gap between the vanes and platforms at a radially inner and outer position.

Thus, in an embodiment 160, shown in FIG. 4A, the airfoil 166 extends between a leading edge 157 and a trailing edge 159. The airfoil 166 extends between a radially inner platform 164 joined at 165 to the airfoil 166 and an outer platform 162, also joined at 165 to the airfoil 166. These may be solid connections which will eliminate leakage airfoil.

A PZT actuator 170 is illustrated which communicates with a control 200. Although not shown in FIGS. 3A and 3B, there would be a similar control 200 associated with those embodiments. The control 200 may be part of a full authority digital electronic controller (FADEC) for the engine or may be a standalone controller which is appropriately programmed to achieve the benefits and control as set forth below.

As shown in FIG. 4A, the leading edge 157 is bowed at 174 to change the incident angle over the mid portion of the airfoil span. This may be achieved similar to the control shown at FIG. 3A. An elastomeric connection 172 surrounds the connections 165 of the airfoil 166 to both the platforms 162 and 164.

Notably, the elastomer 172 need not be along the entire axial chord of the airfoil 166. As shown, in the embodiment, it may extend solely from the leading edge 157 to a rear end 178 approximately adjacent the virtual hinge 176.

Figure 4B:
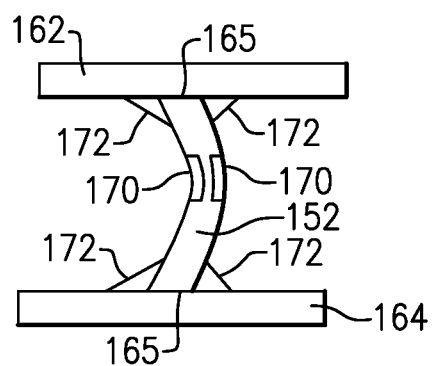
FIG. 4B shows the FIG. 4A vane from a front view.

As shown in FIG. 4B, the bowing at the center provided by the PZT actuator 170 is accommodated by the elastomer 172. The airfoil 166 could be said to have a virtual pivot axis 176. This embodiment is particularly useful for applications which exist in cooler environments. As one example, a military engine fan may benefit from such an arrangement. This allows expanded flexibility for the airfoil geometry in the vicinity of the platforms or end walls 162 and 164.

Figure 5A:
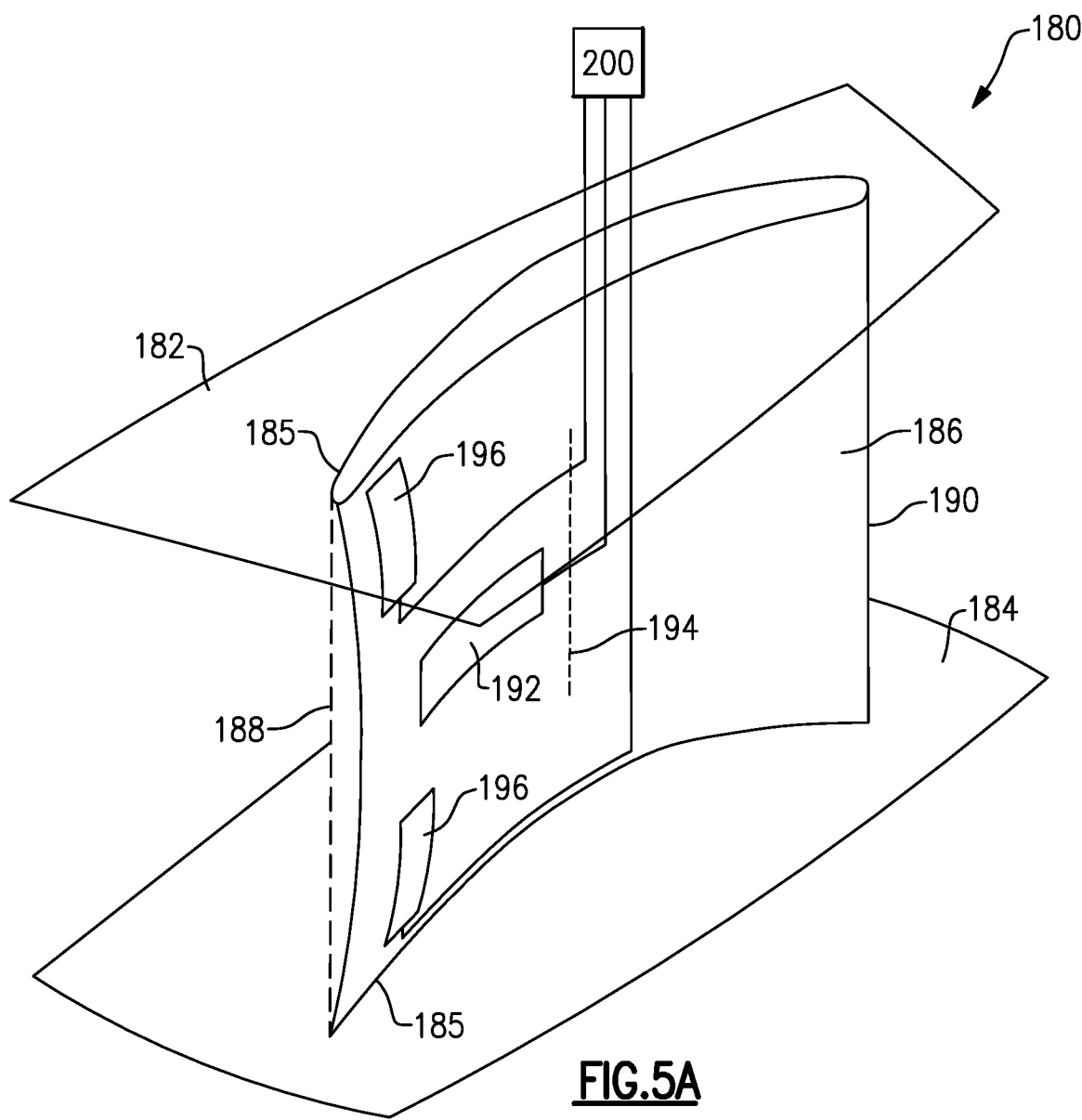
FIG. 5A shows a second embodiment which may be utilized with either the FIG. 3A or FIG. 3B embodiment.

FIG. 5A shows an alternative embodiment 180. Here, the airfoil 186 extends between a leading edge 188 and a trailing edge 190. The platform 184 is secured at 185 to the airfoil 186 and the platform 182 is secured at 185 to the airfoil 182. There is a central PZT actuator 192 which causes bending as described above. An effective or virtual hinge or pivot axis 194 is disclosed here.

However, PZT patches or actuators 196 may be positioned adjacent both the inner and radially outer ends of the airfoil 186. Actuators 196 are oriented at right angles to actuator 192, so that expansion and contraction occur in a direction along the blade span rather than along the blade chord. There may be one actuator 196 located at midspan, or more than one, such as the two shown in FIG. 5A located between actuator 192 and the ends of the airfoil 185. These actuators cause bowing of the airfoil leading edge back without the need for elastomeric material at the ends, as shown in FIG. 4A.

Each of the actuators shown in FIG. 5A has a partner actuator on the other side, not shown.

Figure 5B:
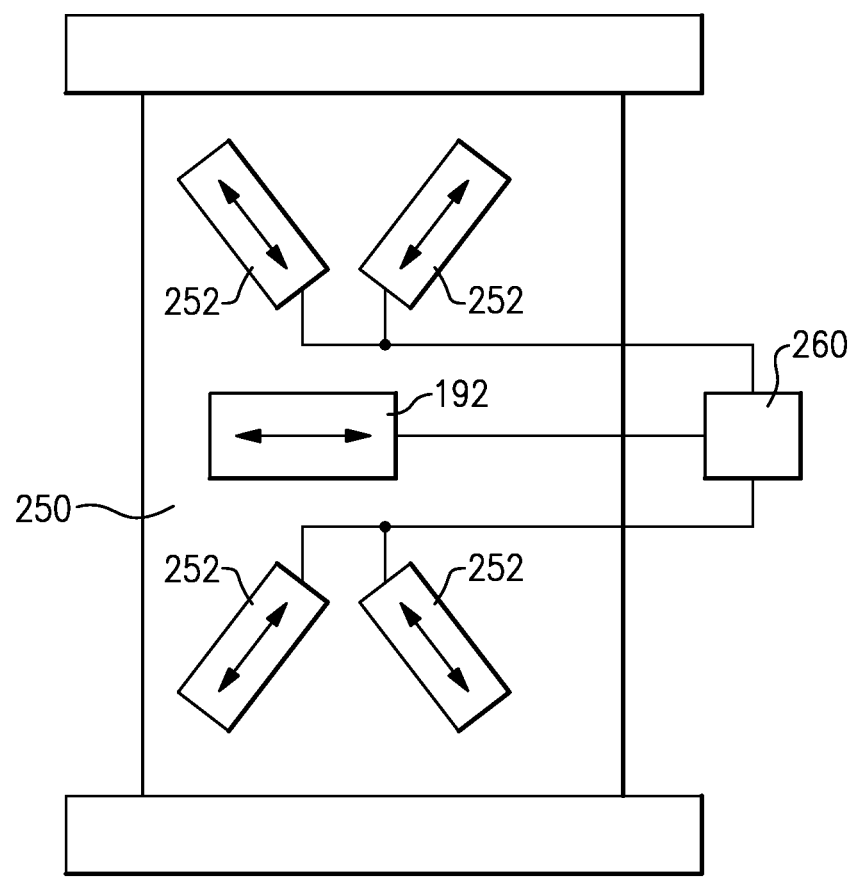
FIG. 5B shows a third embodiment.

Another embodiment 250 illustrated in FIG. 5B would include two actuators 252 on each side, oriented at 90 degrees to one another, but at 45 degrees to the span, and actuator 192, targeting the same bow of the airfoil at the leading edge shown in FIG. 4B. Again, a control 200 is included.

The embodiments shown in FIGS. 5A and 5B are particularly useful for applications which exist in hotter environments in which an elastomeric material would not survive. As one example, a high-pressure compressor may benefit from such an arrangement.

Generically, the FIGS. 5A and 5B could be said to include a radially central piezoelectric actuator 192 that causes a change in the location of at least one of a leading and trailing edges. At least one radially spaced piezoelectric actuator 196/252 is positioned between radially inner and outer ends of the airfoil, and oriented at an angle to the radially central piezoelectric actuator 192 to cause bowing of at least one of the leading and trailing edges.

In the FIG. 5A embodiment, the at least one radially spaced piezoelectric actuator 196 is orientated at a right angle relative to an axis of movement of the radially central piezoelectric actuator 192.

In the FIG. 5B embodiment, the at least one radially spaced piezoelectric actuator 252 includes a pair of radially spaced piezoelectric actuators 252 between the one of radially and inner and outer ends of the airfoil. The actuators 252 are orientated at a right angle relative to each other, and at a 45 degree angle relative to an axis of movement of the radially central piezoelectric actuator 192.

With regard to the FIGS. 4A/B and 5A/B embodiments the PZT actuators may be received in pockets in the airfoils, as in FIG. 3A or 3B.

Figure 6A:
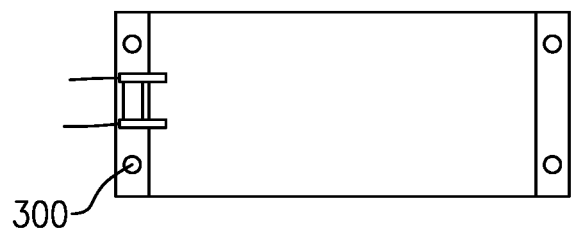
FIG. 6A shows a first type piezoelectric actuator.
Figure 6B:
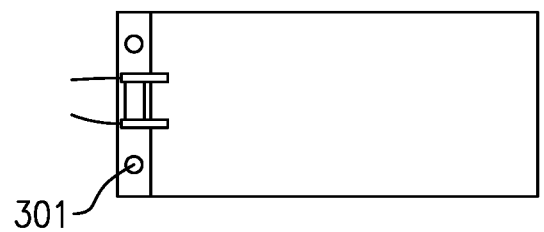
FIG. 6B shows a second embodiment piezoelectric actuator.
Figure 6C:
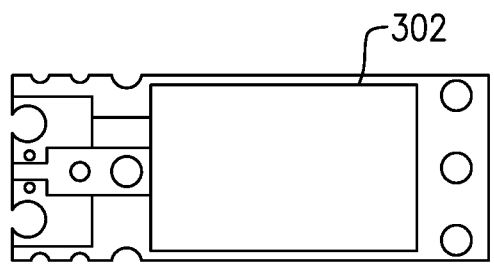
FIG. 6C shows a third embodiment piezoelectric actuator.

FIG. 6A shows various PZT actuators 300, 301, and 302. Examples of such actuators are available under the mark Picma®, such as available at www.piceramic.com is one example of various PZT actuators which may perform the operation as disclosed here.

The independent control of leading and trailing edge metal angles enables a compressor to operate at higher efficiency over its operating range. The angles can be adjusted as either rotational speed or flow rate changes between different operating conditions. With the capability enabled by this disclosure, a compressor airfoil can be designed to deliver maximum efficiency at the cruise design point. Off-design operability can be accommodated by morphing the leading and trailing edges rather than with changes that compromise the design point efficiency, improving fuel consumption.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A stator vane for a gas turbine engine section comprising:
   a stator vane having an airfoil extending between a leading edge and a trailing edge, said airfoil having a suction side and a pressure side, and there being at least one piezoelectric actuator for changing a shape of at least one of said leading edge and said trailing edge;
   wherein said airfoil is connected to radially inner and outer platforms, and there is an elastomeric material between said airfoil and said radially inner and outer platforms to accommodate movement of at least one of said leading and trailing edges; and
   wherein said airfoils are formed of a metal.

2. The stator vane as set forth in claim 1, wherein at least one piezoelectric actuator is mounted on each of said suction and pressure sides, with one of said piezoelectric actuators being controlled to contract and the other being controlled to expand to change the position of said leading edge relative to said trailing edge.

3. The stator vane as set forth in claim 2, wherein said piezoelectric actuators are mounted within pockets in said suction and pressure sides.

4. The stator vane as set forth in claim 2, wherein said piezoelectric actuators are operable to change a position of said leading edge about a virtual hinge axis while changing the position of the trailing edge to a lesser extent.

5. The stator vane as set forth in claim 2, wherein said piezoelectric actuators are operable to change a position of said trailing edge about a virtual hinge axis while changing the position of the leading edge to a lesser extent.

6. The stator vane as set forth in claim 2, wherein said elastomer connection does not extend along an entire axial distance between said leading edge and said trailing edge.

7. The stator vane as set forth in claim 2, wherein said at least one radially spaced piezoelectric actuator is orientated at a right angle relative to the radially central piezoelectric actuator.

8. The stator vane as set forth in claim 2, wherein said at least one radially spaced piezoelectric actuator includes a pair of radially spaced piezoelectric actuators between said one of radially and inner and outer ends of said airfoil and orientated at a right angle relative to each other, and at a 45 degree angle relative to the radially central piezoelectric actuator.

9. The stator vane as set forth in claim 1, wherein said at least one piezoelectric actuator includes at least two, and mounted within pockets in said suction and pressure sides.

10. The stator vane as set forth in claim 9, wherein said piezoelectric actuators are operable to change a position of said leading edge about a virtual hinge axis while changing the position of the trailing edge to a lesser extent.

11. The stator vane as set forth in claim 9, wherein said piezoelectric actuators are operable to change a position of said trailing edge about a virtual hinge axis while changing the position of the leading edge to a lesser extent.

12. A stator vane for a gas turbine engine section comprising:
    a stator vane having an airfoil extending between a leading edge and a trailing edge, said airfoil having a suction side and a pressure side, and there being at least one piezoelectric actuator for changing a shape of at least one said leading edge and said trailing edge;
    wherein said airfoil is connected to radially inner and outer platforms, and there is an elastomeric material between said airfoil and said radially inner and outer platforms to accommodate movement of at least one said leading and trailing edges; and
    wherein said airfoil is connected to radially inner and outer platforms, and a radially central piezoelectric actuator causes a change in a position of said at least one of said leading and trailing edges, and at least one radially spaced piezoelectric actuator is positioned between one of radially inner and outer ends of said airfoil and oriented at an angle to the radially central piezoelectric actuator to cause bowing of at least one of said leading and trailing edges.

13. The stator vane as set forth in claim 12, wherein said at least one radially spaced piezoelectric actuator is orientated at a right angle relative to the radially central piezoelectric actuator.

14. The stator vane as set forth in claim 12, wherein said at least one radially spaced piezoelectric actuator includes a pair of radially spaced piezoelectric actuators between said one of radially and inner and outer ends of said airfoil and orientated at a right angle relative to each other, and at a 45 degree angle relative to the radially central piezoelectric actuator.

15. The stator vane as set forth in claim 12, wherein said airfoils are formed of a metal.

16. A gas turbine engine comprising:
at least one row of rotating blades;
a plurality of stator vanes upstream of said at least one row of blades;
said plurality of stator vanes each being provided with airfoils extending between a leading edge and a trailing edge, said airfoils having a suction side and a pressure side and there being at least one piezoelectric actuator for changing a shape of at least one of said leading edge and said trailing edge;
wherein said airfoil is connected to radially inner and outer platforms, and there is an elastomeric material between said airfoil and said radially inner and outer platforms to accommodate movement of at least one of said leading and trailing edges; and
wherein said airfoils are formed of a metal.

17. The gas turbine engine as set forth in claim 16, wherein said airfoil is connected to radially inner and outer platforms, and a radially central piezoelectric actuator causes a change in a position of said at least one of said leading and trailing edges, and at least one radially spaced piezoelectric actuator is positioned between one of radially inner and outer ends of said airfoil and oriented at an angle to the radially central piezoelectric actuator to cause bowing of at least one of said leading and trailing edges.

* * * * *